United States Patent
Solokhin et al.

(10) Patent No.: US 10,072,963 B1
(45) Date of Patent: Sep. 11, 2018

(54) ULTRASONIC VOLUME-SENSING TRANSDUCER INSTRUMENT WITH CONCAVE TRANSCEIVER ELEMENT

(71) Applicants: Nick V. Solokhin, Concord, CA (US); William M. Hess, Pinole, CA (US); Brian J. Lechman, Concord, CA (US); Alexander V. Drynkin, San Ramon, CA (US); David B. Miller, Concord, CA (US)

(72) Inventors: Nick V. Solokhin, Concord, CA (US); William M. Hess, Pinole, CA (US); Brian J. Lechman, Concord, CA (US); Alexander V. Drynkin, San Ramon, CA (US); David B. Miller, Concord, CA (US)

( * ) Notice: Subject to any disclaimer, the term of this patent is extended or adjusted under 35 U.S.C. 154(b) by 274 days.

(21) Appl. No.: 14/793,647

(22) Filed: Jul. 7, 2015

Related U.S. Application Data

(60) Provisional application No. 62/023,799, filed on Jul. 11, 2014.

(51) Int. Cl.
*G01F 23/296* (2006.01)

(52) U.S. Cl.
CPC .................. *G01F 23/296* (2013.01)

(58) Field of Classification Search
CPC ............... G01F 23/296; G01F 23/2962; G01F 23/2965; G01F 23/2966; G01F 23/2967; G01F 23/2968; G01F 23/2963
USPC ...................................................... 73/290 V
See application file for complete search history.

(56) References Cited

U.S. PATENT DOCUMENTS

| | | | | | |
|---|---|---|---|---|---|
| 2,741,754 | A | * | 4/1956 | Miller ................... | B06B 1/0651 367/162 |
| 3,277,435 | A | * | 10/1966 | Thompson ............ | B06B 1/0685 367/157 |
| 3,608,715 | A | * | 9/1971 | Snyder ................... | G01N 29/02 209/590 |
| 3,663,842 | A | * | 5/1972 | Miller .................... | B06B 1/067 252/62 |
| 3,995,179 | A | * | 11/1976 | Flournoy ............. | G10K 11/002 310/335 |
| 4,130,018 | A | * | 12/1978 | Adams ................ | G01F 23/2962 310/327 |
| 4,183,249 | A | * | 1/1980 | Anderson ................ | A61B 8/00 73/626 |

(Continued)

FOREIGN PATENT DOCUMENTS

| | | | |
|---|---|---|---|
| RU | 2180433 C2 | * | 3/2002 |
| SU | 613213 A | * | 6/1979 |

*Primary Examiner* — Peter Macchiarolo
*Assistant Examiner* — Alexander Mercado
(74) *Attorney, Agent, or Firm* — Richard Esty Peterson

(57) ABSTRACT

A liquid-level sensing instrument for determining the level of a liquid in a container or vessel such as a laboratory tube in a rack or a well in a well plate with the container having an acoustically transparent top opening to direct ultrasonic signals to the liquid surface and receive reflected signals where the transceiver sensor instrument is constructed with a piezoelectric focusing sensor that has a concave focusing surface for focusing ultrasonic signals through the opening to the liquid surface in a selected container particularly a container in a group of containers and receiving reflected signals for processing.

16 Claims, 4 Drawing Sheets

(56) References Cited

U.S. PATENT DOCUMENTS

| | | | | |
|---|---|---|---|---|
| 4,184,094 A | * | 1/1980 | Kopel | G10K 11/32 310/327 |
| 4,570,483 A | * | 2/1986 | Sobue | G01F 23/2967 73/114.56 |
| 4,655,083 A | * | 4/1987 | Chubachi | G01N 29/06 73/606 |
| 4,703,652 A | * | 11/1987 | Itoh | G01F 23/2967 29/25.35 |
| 4,730,650 A | * | 3/1988 | Ziegler | G01F 23/28 137/392 |
| 4,735,240 A | * | 4/1988 | Ziegler | G01F 23/28 137/392 |
| 4,744,395 A | * | 5/1988 | Ziegler | G01F 23/28 137/392 |
| 4,961,456 A | * | 10/1990 | Stembridge | B06B 1/0681 141/1 |
| 4,984,449 A | * | 1/1991 | Caldwell | G01M 3/3245 73/290 V |
| 5,024,093 A | * | 6/1991 | Sasaki | G01N 29/262 73/633 |
| 5,036,707 A | * | 8/1991 | Paciej | F17C 13/02 73/633 |
| 5,159,838 A | * | 11/1992 | Lynnworth | B06B 3/00 73/644 |
| 5,402,681 A | | 4/1995 | Nakaso et al. | |
| 5,483,226 A | * | 1/1996 | Menut | G01F 23/2961 340/618 |
| 5,515,733 A | * | 5/1996 | Lynnworth | G01F 1/662 73/644 |
| 5,664,456 A | * | 9/1997 | Eckert | B06B 1/0681 310/324 |
| 5,737,963 A | * | 4/1998 | Eckert | G01F 23/2968 310/338 |
| 5,836,192 A | * | 11/1998 | Getman | B06B 1/06 340/621 |
| 5,922,961 A | * | 7/1999 | Hsu | G01N 29/06 310/336 |
| 5,929,763 A | * | 7/1999 | Koski | G01F 23/2963 324/207.21 |
| 6,227,053 B1 | * | 5/2001 | Purpura | G01F 23/296 73/290 V |
| 6,374,676 B1 | * | 4/2002 | Arnold | G10K 9/122 310/324 |
| 6,536,275 B1 | * | 3/2003 | Durkee | G01F 23/2962 73/290 R |
| 6,539,819 B1 | * | 4/2003 | Dreyer | G01D 11/24 73/431 |
| 6,938,488 B2 | * | 9/2005 | Diaz | G01N 29/024 73/52 |
| 7,307,373 B2 | * | 12/2007 | Straub, Jr. | G01F 1/662 310/334 |
| 7,360,417 B2 | * | 4/2008 | Dockendorff | G01F 23/2965 367/908 |
| 7,426,866 B2 | * | 9/2008 | Van Tuyl | G01N 29/024 222/420 |
| 7,607,347 B2 | * | 10/2009 | Dockendorff | G01F 23/2961 73/290 V |
| 7,628,064 B1 | * | 12/2009 | Miller | G01F 22/00 422/63 |
| 7,900,338 B2 | * | 3/2011 | Straub, Jr. | G01F 1/662 29/592.1 |
| 8,296,084 B1 | * | 10/2012 | Hickling | G01B 17/00 702/187 |
| 8,354,773 B2 | * | 1/2013 | Oliver | A61B 8/4483 310/327 |
| 8,534,138 B2 | * | 9/2013 | Gottlieb | G01F 1/662 73/861.28 |
| 8,683,882 B2 | * | 4/2014 | Jackson | G01N 29/24 73/633 |
| 8,976,017 B1 | * | 3/2015 | Cannon | G01N 29/043 340/514 |
| 8,988,971 B2 | * | 3/2015 | Mueller | G01F 23/296 367/140 |
| 2004/0035208 A1 | * | 2/2004 | Diaz | G01N 29/024 73/597 |
| 2004/0136271 A1 | * | 7/2004 | Gluszyk | G01F 23/2968 367/174 |
| 2005/0039533 A1 | * | 2/2005 | Spanke | G01F 23/2968 73/611 |
| 2005/0132797 A1 | * | 6/2005 | Klees | G01F 23/284 73/290 V |
| 2006/0144871 A1 | * | 7/2006 | Van Tuyl | G01N 29/024 222/420 |
| 2006/0169056 A1 | * | 8/2006 | Dockendorff | G01F 23/2965 73/861.23 |
| 2007/0012113 A1 | * | 1/2007 | Ulmer | G01F 23/2962 73/618 |
| 2007/0035212 A1 | * | 2/2007 | Straub, Jr. | G01F 1/662 310/348 |
| 2007/0044708 A1 | * | 3/2007 | Haynes | G01F 23/2961 117/14 |
| 2007/0209440 A1 | * | 9/2007 | Dockendorff | G01F 23/2961 73/642 |
| 2008/0061772 A1 | * | 3/2008 | Janitch | G01F 23/2963 324/207.26 |
| 2009/0151460 A1 | * | 6/2009 | Thorne, IV | B01L 3/50255 73/662 |
| 2012/0174665 A1 | * | 7/2012 | Wimberger | G01D 21/02 73/295 |
| 2012/0266677 A1 | * | 10/2012 | Mueller | G01F 23/296 73/632 |
| 2012/0285239 A1 | * | 11/2012 | D'Angelico | G01F 23/2967 73/295 |
| 2012/0320713 A1 | * | 12/2012 | Mueller | G01F 23/296 367/141 |
| 2013/0014592 A1 | * | 1/2013 | Mueller | B06B 1/0655 73/861.27 |
| 2013/0160556 A1 | * | 6/2013 | Barger | G01H 11/08 73/645 |
| 2013/0269430 A1 | * | 10/2013 | Mauduit | G01F 23/284 73/290 V |
| 2014/0230542 A1 | * | 8/2014 | Molitor | G01F 23/2961 73/290 V |
| 2015/0355012 A1 | * | 12/2015 | Gurumohan | A47G 19/00 702/55 |
| 2016/0178426 A1 | * | 6/2016 | Gurumohan | G01F 23/2962 73/290 V |
| 2016/0198246 A1 | * | 7/2016 | Gurumohan | H04Q 9/00 340/870.02 |

\* cited by examiner

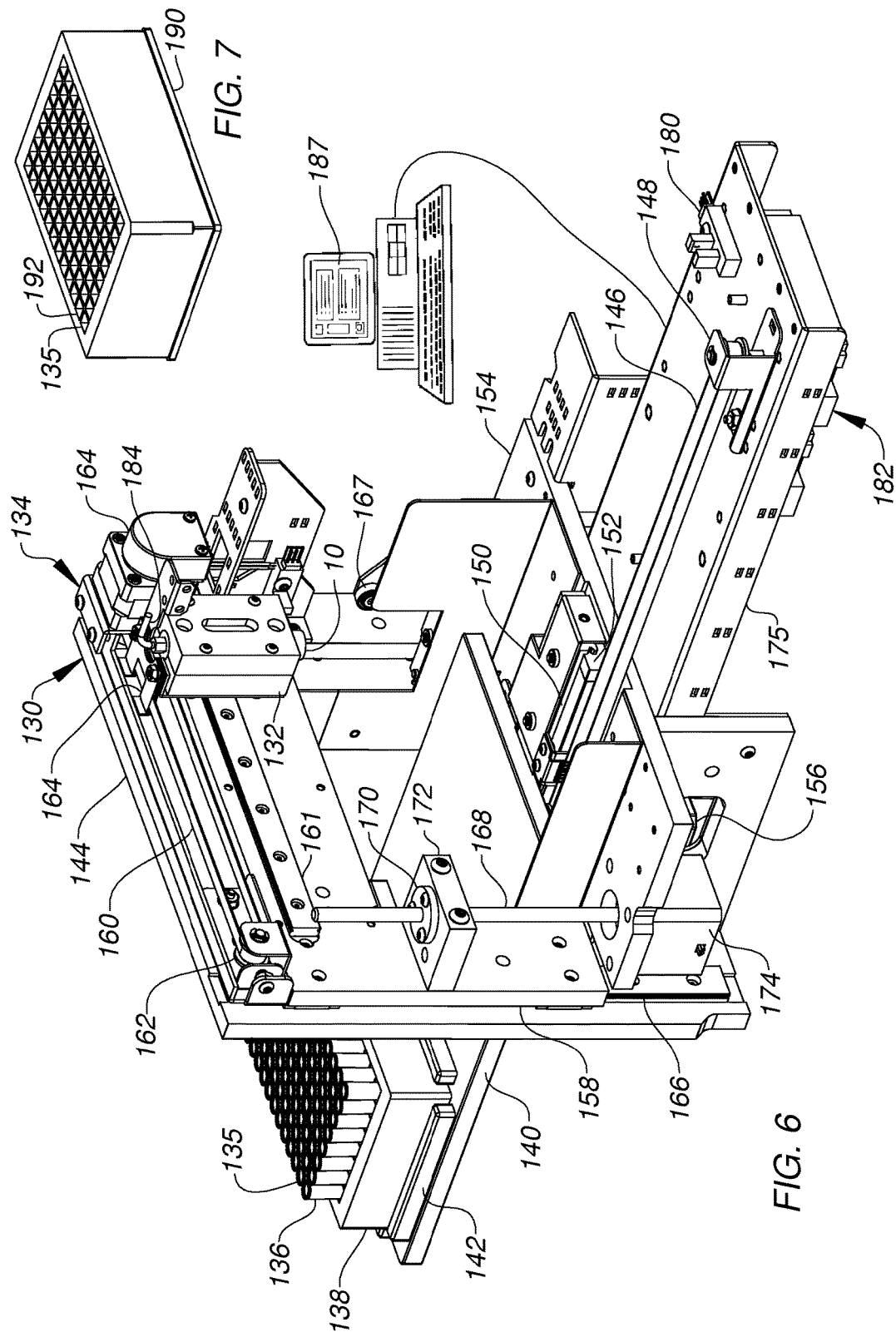

US 10,072,963 B1

ULTRASONIC VOLUME-SENSING TRANSDUCER INSTRUMENT WITH CONCAVE TRANSCEIVER ELEMENT

CROSS-REFERENCE TO RELATED APPLICATIONS

This application claims the priority date of Provisional Application of the same title, U.S. 62/023,799, filed Jul. 11, 2014.

FEDERALLY SPONSORED RESEARCH

Not Applicable

SEQUENCE LISTING OR PROGRAM

Not Applicable

FIELD OF INVENTION

This invention relates to an ultrasonic transducer with a concave transceiver element for determining the volume of liquids in small diameter laboratory containers particularly densely packed sample wells in a laboratory well plate or tightly packed laboratory tubes in a tube rack.

BACKGROUND OF THE INVENTION

The ultrasonic transducer instrument of this invention is preferably used in conjunction with a robotic transport device for positioning of the ultrasonic transducer instrument over a select well in the well plate for volume determination.

An ultrasonic transducer for volume determination is a sensor that can measure the distance to the surface level of the contents of a laboratory container without contact with the contents of the container. Knowing the distance to the bottom of an empty container, this sensor can therefore be used with a processor to determine the volume of the contents in a selected laboratory tube, open vial or other laboratory container, as well as a well in a well plate. Having the distance to the surface and the geometry and parameters of the container (and other numerous metrics indigenous to the material of the container and contents under examination) a programmed processor with the appropriate algorithm can calculate the volume of the contents in a target container.

The ultrasonic transducer as a volume sensor was devised to quickly determine the volume of the contents of a laboratory container by measuring the distance of a transducer emitter signal to the surface of the container contents, typically a liquid, using ultrasonic sound waves. The sound waves bounce off the surface of the container contents and return to a receiver for processing.

For containers having large diameter openings, a flat emitter element and a flat receiver element are sufficient. Combining the flat emitter element and the flat receiver element into a single transceiver element, which both emits and receives ultrasonic sound pulses, has enabled vessels with smaller diameter openings to be accessed with this technique of volume determination.

However, as the number of laboratory sample containers in a rack or plate increase, the density of container cells in a designated area also increases and therefore requires containers with very small openings. An ultrasonic transducer sensor with a flat transceiver element returns a weakly defined signal that cannot reliably be used to calculate the volume in wells in high-density well plates. Such well plates may include well arrays having 384 or 1536 wells. In such arrays, wells have an approximate well opening of 3 mm for the 384 well array, and 1.5 mm for the 1536 well array. As the target opening diminishes, the difficulty in focusing sound waves to the target opening increases.

Additional complexity is added by the fact well openings may be round or square, and may have acoustic effects inherent in the materials of the racks and well plates that dampen or reflect acoustic waves. The subject invention provides an instrument and a system to address these problems. The instrument by its basic tubular, shell-casing configuration is well adapted for mounting on laboratory robotic transport apparatus for access to select cells in arrays of segregated test samples.

SUMMARY OF THE INVENTION

The ultrasonic volume-sensing instrument of this invention is a sound-focusing sensor that utilizes a concave transceiver element in a tubular casing to gauge the volume of liquid in a target container. In particular, the target container is one of a plurality of tightly arranged containers in a laboratory liquid sample or specimen grouping, typically an orthogonal matrix or a staggered-row arrangement of containers, as in a well plate, or container cells, as in a tube rack for laboratory tubes.

The tubular ultrasonic transducer can be mounted as an accessory to a conventional robotic transport apparatus for test sampling of containers in container arrays, typically tube racks and well plates. Both tube racks and well plates may be ganged on trays or beds in accordance with the capacity and capabilities of the associated robotic transport apparatus. Being compact and tubular, with a co-axial cable for electronic signal connection to electronic processing apparatus for bi-directional signal transfer, the volume sensing instrument of this invention is well adapted for convenient integration into laboratory equipment, particularly a robotic transport apparatus that can direct the volume-sensing instrument to a select location.

The ultrasonic volume-sensing instrument also incorporates methods of determining the operational parameters of the instrument for the task of determining the volume of material in a variety of standardized laboratory containers without physical contact of the contents in the container by the measuring instrument.

BRIEF DESCRIPTION OF THE DRAWINGS

FIG. 6 is a perspective view of a preferred robotic transport mechanism electronically connected to a general purpose programmable computer, shown schematically.

FIG. 7 is a perspective view of a conventional well plate with a plurality of wells.

DETAILED DESCRIPTION OF THE PREFERRED EMBODIMENTS

Figure 1:
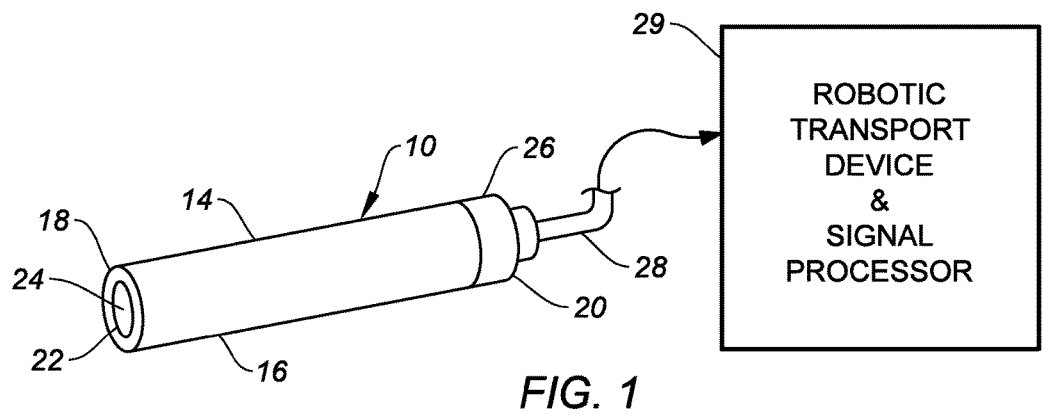
FIG. 1 is a perspective view of the ultrasonic sensor instrument of this invention with a connecting cable.

Referring to FIG. 1, the liquid-level sensing instrument of this invention is designated in general by the reference numeral 10. The liquid-level sensing instrument, or sensor instrument 10, has a tubular casing 14 with an outer housing 16 having a sensor end 18 and a terminal end 20. The sensor end 18 of the outer housing 16 has an embedded ultrasonic sensor assembly 22 with a piezoelectric focusing sensor 24 that is directed at the open end of a target container or vessel. The terminal end 20 of the outer housing 16 has an electronic connector assembly 26 with a coaxial cable 28 that electronically connects the sensor instrument 10 to a signal processor 29, shown diagrammatically in FIG. 1. The structure of the tubular casing 14 provides a convenient cylindrical cartridge for mounting the sensor instrument 10 to a robotic transport mechanism such as the device described in U.S. Pat. No. 7,628,064, entitled, "Ultrasonic Height and Volume Measuring Instrument for Laboratory Test Containers," issued Dec. 8, 2009, incorporated herein by reference.

Figure 2:
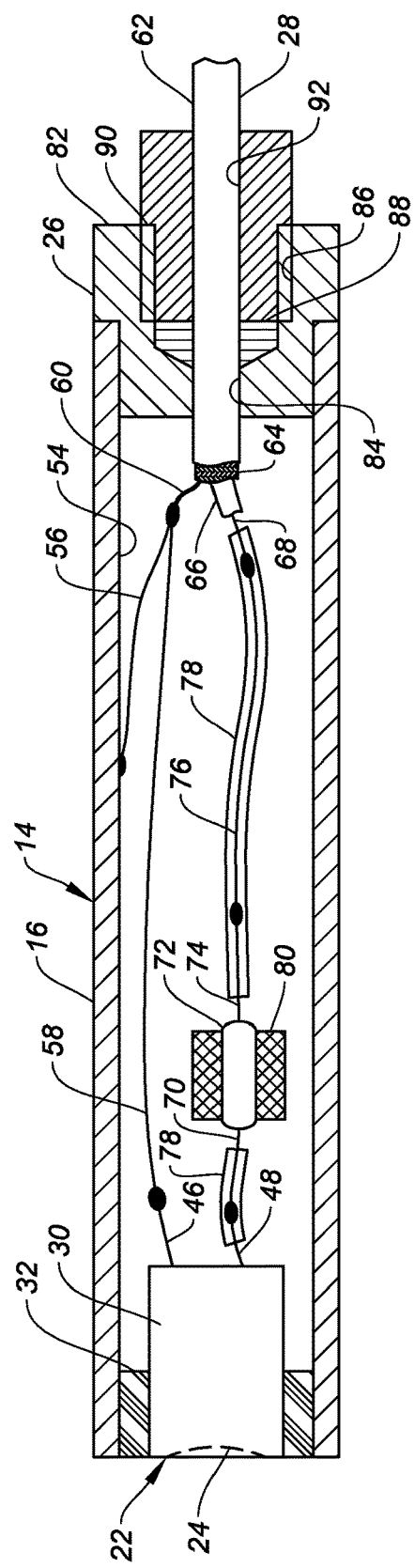
FIG. 2 is a cross sectional view of the sensor instrument of FIG. 1.
Figure 3:
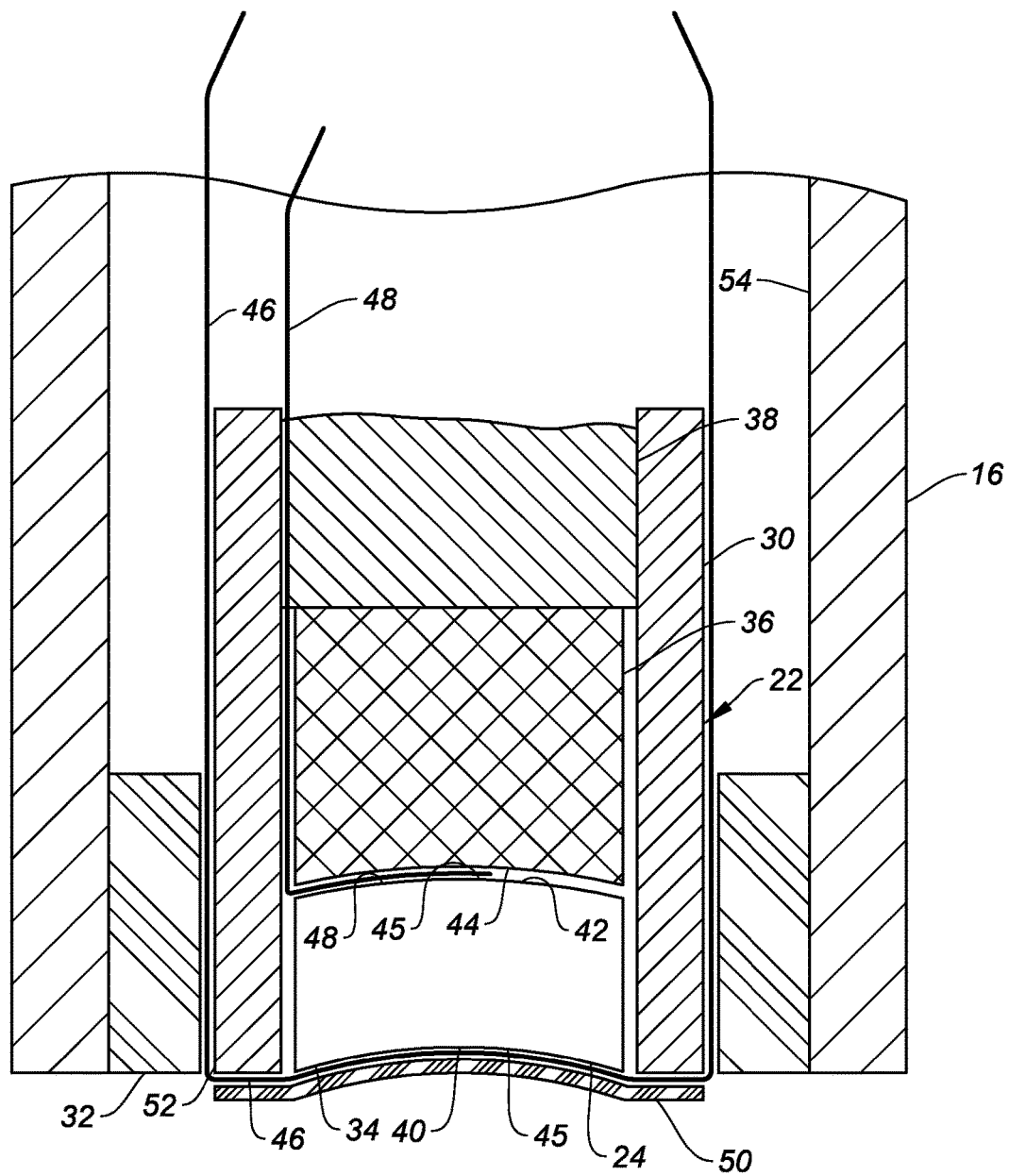
FIG. 3 is an enlarged partial cross sectional view of the sensor instrument of FIG. 2.

Referring to the cross-sectional views of FIGS. 2 and 3, the ultrasonic sensor assembly 22 has an inner housing 30 that is concentric to the outer housing 16 and displaced therefrom by a foamed-rubber band 32. The foamed-rubber band 32 is formed of a closed-cell expanded polymer that provides acoustic and vibration isolation to the sensitive ultrasonic sensor assembly 22. As shown in the enlarged, partial cross-sectional view of FIG. 3, the piezoelectric sensor 24 is contained largely within the inner housing 30, and includes a piezoelectric element 34, or piezo-element, seated on a mass backing 36. The mass backing 36 is a plastic material located behind the piezo-element 34 for damping of unwanted ultrasonic waves directed toward the terminal end 20 of the sensor instrument. The components are ultimately sealed within the inner housing 30 by epoxy glue, which forms an end plug 38.

The piezoelectric element 34 is an ultrasonic transceiver, which both radiates and receives ultrasonic waves. The focusing effect of the piezo-element 34 is generated by a concave outer surface 40. It is preferred that the piezo-element 34 have a corresponding convex inner surface 42 that abuts a matching concave contact surface 44 at the end of the mass backing 36.

Both the concave outer surface 40 and the convex inner surface 42 have a conductive film 45, preferably gold, that is provided by the fabricator of the piezo-element. A flat, thin strip of copper foil forming a ground wire 46 is glued across the concave outer surface 40 and a similar strip forming a potential wire 48 is glued across part of the convex inner surface 42. A thin, silicon rubber frontal layer 50 is glued with a silicon rubber glue to the concave outer surface 40 of the piezo-element 34. The frontal layer 50 is matched to one-quarter of the ultrasonic wavelength that excites the piezo-element. The frontal layer 50 extends only to the perimeter 52 of the inner housing 30 to maintain the isolation of the inner housing 30 from the outer housing 16. It is to be understood that the narrow gaps between the components in the enlarged partial view of FIG. 3 are for the purpose of clarity and not intended to depict a structural feature of the assemblies.

Referring again to FIG. 2, the outer housing 16 has an inner copper foil shield 54 glued with an epoxy glue to the non-conductive polymer of the outer housing 16. A ground wire 56 soldered to the foil shield 54 is joined with a ground wire 58 connected to the thin strip ground wire 46, and the joined wires are connected to a terminal wire 60 of the coaxial cable 28. The coaxial cable 28 has a non-conductive jacket 62, a concentric inner conductive shield 64, typically a braided metal with or without an inner metal foil, a dielectric insulator 66 and a center conductor 68. In the basic embodiment of FIG. 2 the terminal wire 60 is a twisted portion of the stripped out mesh shield 64.

The thin strip potential wire 48 is soldered to a lead wire 70 of an RF shock inductor 72 with the other lead wire 74 connected to a potential wire 76, which in turn is connected to the potential center conductor 68 of the coaxial cable 28. Preferably, the potential wires and lead wires are covered with insulator sleeves 78 and the inductor 72 is covered with an inductance protection casing 80 to minimize interference and inadvertent shorting.

The RF shock inductor 72 is matched to the particular capacitance characteristics of the piezo-element at the frequency of system operation. In the described embodiment, the work frequency is 750 kHz, and the inductance is 470 µH. The protection casing 80 of the inductor 72 is formed by a plastic isolation tape with a wrap diameter of approximately 9 mm making some room for the magnetic field of inductance. The electronic connector assembly 26 has a cable holder plug 82 at the terminal end 20 of the outer housing 16. The cable holder plug 82 is partially inserted into the outer housing 16 and secured with epoxy glue. The cable holder plug 82 has a cable passage 84 through which the coaxial cable 28 is inserted and also has a threaded recess 86 into which a rubber seal 88 is inserted and seated. A clamping screw 90 with a cable passage 92 is threaded into the cable holder plug 82 and compresses the rubber seal 88 around the jacket 62 of the coaxial cable 28 to both retain the cable and seal the tubular casing 14.

Figure 4A:
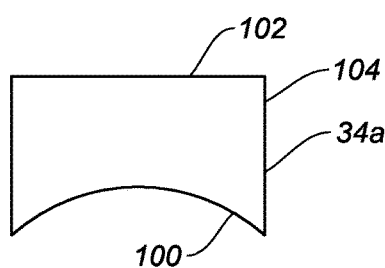
FIG. 4A is an enlarged cross sectional view of a first alternate configuration of a concave piezoelectric transceiver element.
Figure 4B:
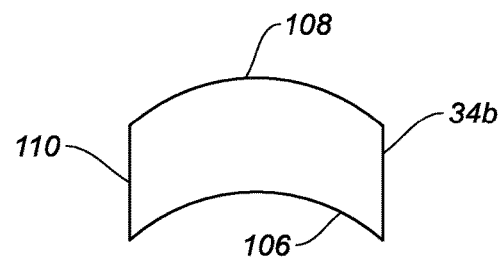
FIG. 4B is an enlarged cross sectional view of a second alternate configuration of a concave piezoelectric transceiver element also shown in FIG. 2.
Figure 4C:
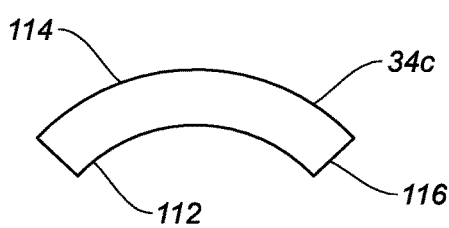
FIG. 4C is an enlarged cross sectional view of a third alternate configuration of a concave piezoelectric transceiver element.

Referring now to FIGS. 4A, 4B and 4C, three alternate variations of the piezo-element are schematically illustrated. In FIG. 4A the piezo-element 34a has a concave focusing surface 100, a flat backing surface 102 and a cylindrical perimeter 104. The structure of the piezo-element 34a minimizes the fabrication and mounting difficulties, however, the focusing ability is diminished.

In FIG. 4B the piezo-element 34b has a concave focusing surface 106, a convex backing surface 108 and a cylindrical perimeter 110. The curvature of the concave focusing surface 106 matches the curvature of the convex backing surface 108 and improves the focusing ability while maintaining the cylindrical perimeter 110 that facilitates mounting. The piezo-element 34 in the embodiment of FIGS. 2 and 3 is of this type and is conveniently mounted in a cylindrical housing as shown in FIGS. 2 and 3. Having the same radius of curvature provides a superior operation over a well plate with a small diameter well and the design is specific to a target range of well diameters and depths.

Figure 5:
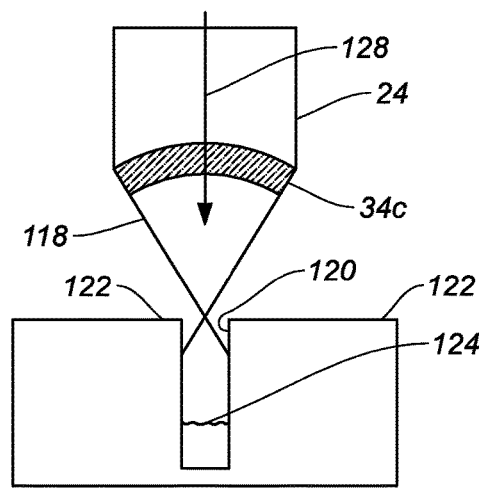
FIG. 5 is a diagrammatic illustration of a preferred concave piezoelectric transceiver element directing a focused burst of ultrasonic waves at a container with a level of liquid.

In FIG. 4C the piezo-element 34c has a concave focusing surface 112, a convex backing surface 114 and a beveled perimeter edge 116. The concave focusing surface 112 and the convex backing surface 114 have the same radial center point thus generating concentric, but different curvatures. With the beveled edge 116 similarly defined by the common center point, the focusing ability is optimized as schematically shown in FIG. 5. With a common centerpoint, the piezo-element 34c is at optimum focus and is designed to a specific well diameter and expected liquid depth. The beveled perimeter edge 116 tempers the wave scatter around the perimeter and improves performance.

Notably, as the diameter of wells on a well plate become smaller, the waves at the vessel opening increases. The ability to utilize ultrasonics in determining liquid volume in vessels, particularly small diameter wells in densely packed well plates, depends on multiple parameters. These parameters include the frequency of ultrasonic driving signal, physical size and curvature of the piezo-element, distance of transmitter element (the piezo-element) from the vessel opening and surface of the liquid, the size and shape of the vessel opening, the range of liquid depths in the vessel, and even the characteristics of both the liquid and the material of the well plate, which may affect the profile of the meniscus and hence the ultimate calculation of the liquid volume. By vessel opening, it is meant operationally transparent to the ultrasonic waves as in a covering over the vessel opening.

The metrics and variables can be tailored to specific laboratory tubes or well plates, which may necessitate substitution of the liquid level sensing instrument with one having a different set of operating requirements.

As shown in FIG. 5, the piezo-element 34c in the piezoelectric sensor 24 has a curvature that focuses the ultrasonic pulse beam 118 to the opening 120 of the container 122. The container 122, an exemplar vessel for a test liquid with a liquid surface 124 shows an opening 120 for a focused ultrasonic pulse beam 118 that is idealized.

The pulse beam 118 directs its wave energy to the surface 124 of the test liquid and is reflected back to the piezo-element 34c. The central axis 128 of the combined transmitter and receiver allows a narrow beam to be projected, and a narrow reflective beam to be received for processing with a degree of confidence. Because of the constraints in directing a beam and receiving an echo signal for small diameter vessels the use of a single piezo-element that functions both as a transmitter and as a receiver that is aligned on the central axis 128 is greatly preferred.

Referring now to FIG. 6, a preferred robotic transport mechanism 130 is shown. The robotic transport mechanism 130 is normally enclosed in a casing or housing which has been removed to illustrate the basic mechanical elements that permit mounting the sensor instrument 10 in a carriage block 132. The carriage block 132 with the cooperation of the transport assembly 134 enables the sensor instrument 10 to be displaced over any one of the densely packed containers 135, here laboratory tubes 136, in a standard 96 tube, tube rack 138. It is to be understood that instead of the exemplar laboratory tubes 136 and tube rack 138, the containers may comprise wells in a standard well plate.

The tube rack 138 is mounted on a transport deck 140 and positioned by guide bars 142. The transport deck 140 is shown extended out beyond the remaining elements of the transport assembly 134 to facilitate loading of the tube rack 138 onto the transport deck 140. The transport deck 140 is withdrawn under an overhead bridge structure 144 to permit positioning the sensor instrument 10 over a select laboratory tube 136 by a motor driven belt 146. The motor driven belt 146 rounds an idler wheel 148 and connects to a slide 150 that is slideable in a guide 152 on a support bed 154. A drive capstan (not visible) driven by a precision motor 156 (partly visible) transports the transport deck 140 along an X direction to locate any one of the eight rows of laboratory tubes 136 in the 96 tube, tube rack 138 under the sensor instrument 10.

In order to access a select tube 136 in the twelve rows of laboratory tubes in the tube rack 138, the bridge structure 144 carries a moveable support frame 158 that has a cross track 161 on which the carriage block 132 is slideably connected. The support frame 158 has a similar motor driven belt 160 that rounds an idler wheel 162 and is connected by a bracket 164 to the carriage block 132. The motor driven belt 160 rounds a drive capstan (not visible) that is rotated by a precision drive motor 164. In this manner the carriage block 132 can be transported to any position in the Y direction to locate the sensor instrument 10 over a select tube in the twelve tube row.

The H-shape support frame 158 is also displaceable and rides on at least one guide track 166 to displace in the vertical or Z direction. A guide roller 167 aids in maintaining the position of the support frame 158 as it is moved up and down. Displacement of the support frame 158 is actuated by a vertical screw 168 that engages a threaded bearing 170 fixed in a mounting block 172 attached to the support frame 158. The vertical screw 168 is rotated by a precision motor 174 mounted to a support plate 154. The support plate 154 in part supports the elongated sheet metal electronics cartridge 175 on which the idler wheel 148 is mounted. A limit sensor 180 is also mounted on the top of the electronics cartridge 175 to limit the displacement of the slide 150.

The electronic components 182 for operation of the X Y Z displacements are mounted on the underside of the electronics cartridge 175. The electronics may include a microprocessor 187 to assist a programmable computer, shown schematically, for programmed operation of the robotic transport mechanism 130. Input and output for the sensor instrument 10 is supplied by wiring through a protective elbow sleeve 184.

In FIG. 7, a conventional or standard well plate 190 is shown with containers 135 in the form of multiple wells 192 for holding a liquid for measuring by the liquid-level sensing instrument 10.

It is to be understood that the described robotic transport mechanism 130 is but one preferred XYZ robotic device for automatically positioning the sensor instrument 10 over a select container during operation. Additionally, the liquid-level sensing instrument described in the detailed description of the invention is a preferred embodiment. Changes may be made without departing from the scope and spirit of the invention as set forth in the claims that follow.

The invention claimed is:

1. In a system that determines the level of a liquid in a container having a top opening exposed to air, the container being adapted to hold a liquid with a liquid surface, a liquid-level sensing instrument comprising:
   a tubular casing with a sensor end having an opening and a terminal end,
   an ultrasonic sensor assembly having a single piezoelectric focusing sensor that is mounted at the sensor end of the casing, wherein the focusing sensor is a transceiver element that has a concave focusing surface located at the opening of the sensor end of the casing, and focused at the top opening of the container when located over the container, wherein the casing is an outer housing and the liquid-level sensing instrument has an inner housing displaced from the outer housing with an acoustic and vibration isolation material between the outer housing and inner housing that provides acoustic and vibration isolation to the ultrasonic sensor assembly, and wherein the focusing sensor has a back surface opposite the focusing surface and the ultrasonic sensor assembly has a mass backing against the back surface of the focusing sensor, the mass backing damping unwanted ultrasonic waves directed toward the terminal end of the casing, an electronic connector assembly mounted at the terminal end of the casing, an external signal processor that processes electrical signals to and from the piezoelectric focusing sensor, and, an electrical cable electronically connected to the piezoelectric focusing sensor, wherein the electrical cable passes through the electronic connector assembly and electronically connects the piezoelectric focusing sensor to the external signal processor.

2. The liquid-level sensing instrument of claim 1 wherein the inner housing is arranged around the ultrasonic sensor assembly and the material between the outer housing and the inner housing is a foamed rubber.

3. The liquid-level sensing instrument of claim 1 wherein the casing is the outer housing and the inner housing is concentric with the outer housing.

4. The liquid-level sensing instrument of claim 3 wherein the acoustic and vibration isolation material between the outer housing and the inner housing is a foamed-rubber band.

5. The liquid-level sensing instrument of claim 1 wherein the piezoelectric focusing sensor mounted at the sensor end of the casing has a back surface opposite the focusing surface that is convex.

6. The liquid-level sensing instrument of claim 5 wherein the ultrasonic sensor assembly has a mass backing against the convex back surface of the focusing sensor conforming to the convex back surface of the focusing sensor, the mass backing damping unwanted ultrasonic waves directed toward the terminal end of the casing.

7. The liquid-level sensing instrument of claim 6 wherein the concave focusing surface of the focusing sensor has a curvature and the convex back surface of the focusing sensor has a curvature that is the same as the curvature of the focusing surface of the focusing sensor.

8. The liquid-level sensing instrument of claim 6 wherein the concave focusing surface of the focusing sensor has a curvature and the convex back surface of the focusing sensor has a curvature that is concentric with the curvature of the focusing surface of the focusing sensor.

9. The liquid-level sensing instrument of claim 8 wherein the focusing sensor has a beveled edge and wherein the curvature of the concave focusing surface, the curvature of the convex back surface and the beveled edge have a common focal point.

10. The liquid-level sensing instrument of claim 1 wherein the piezoelectric focusing sensor mounted at the sensor end of the casing has a back surface opposite the focusing surface that is flat.

11. The liquid-level sensing instrument of claim 10 wherein the ultrasonic sensor assembly has a mass backing against the flat back surface of the focusing sensor conforming to the flat back surface of the focusing sensor, the mass backing damping unwanted ultrasonic waves directed toward the terminal end of the casing.

12. The liquid-level sensing instrument of claim 1 wherein the ultrasonic sensor assembly has an epoxy end plug against the mass backing to seal the focusing sensor and the mass backing to the inner housing.

13. The liquid-level sensing instrument of claim 1 wherein the concave focusing surface of the piezoelectric focusing sensor has a silicon rubber frontal layer.

14. The liquid-level sensing instrument of claim 1 further comprising an inductor having two lead wires wherein the electrical cable has a potential conductor connected to one lead wire of the inductor and the focusing sensor has a strip potential wire connected to the other lead wire of the inductor.

15. The liquid-level sensing instrument of claim 1 in combination with a robotic transport mechanism, the level-sensing instrument being mounted to a moveable carriage member that automatically positions piezoelectric focusing sensor over a select container during operation.

16. In a system that determines the level of a liquid in a container having a top opening exposed to air, the container being adapted to hold a liquid with a liquid surface, a robotic transport mechanism with a liquid-level sensing instrument that is locatable over the container comprising:

a tubular casing with a sensor end having an opening and a terminal end, an ultrasonic sensor assembly having a single piezoelectric focusing sensor that is mounted at the sensor end of the casing, wherein the focusing sensor is a transceiver element that has a concave focusing surface located at the opening of the sensor end of the casing and focused at the top opening of the container when located over the container, wherein the casing is an outer housing and the liquid-level sensing instrument has an inner housing displaced from the outer housing with an acoustic and vibration isolation material between the outer housing and inner housing that provides acoustic and vibration isolation to the ultrasonic sensor assembly, and wherein the focusing sensor has a back surface opposite the focusing surface and the ultrasonic sensor assembly has a mass backing against the back surface of the focusing sensor, the mass backing damping unwanted ultrasonic waves directed toward the terminal end of the casing, an electronic connector assembly mounted at the terminal end of the casing, an external signal processor that processes electrical signals to and from the piezoelectric focusing sensor, and, an electrical cable electronically connected to the piezoelectric focusing sensor, wherein the electrical cable passes through the electronic connector assembly and electronically connects the piezoelectric focusing sensor to the external signal processor.

\* \* \* \* \*